United States Patent

[11] 3,553,439

[72] Inventor Isidore Dorman
Whitestone, N.Y.

[21] Appl. No. 672,793
[22] Filed Oct. 4, 1967
[45] Patented Jan. 5, 1971
[73] Assignee Bellhow Jackets Inc.
a corporation of Delaware. by mesne assignments

[54] MICROFICHE MASTER HAVING MAGNETIC TRACKS
4 Claims, 3 Drawing Figs.

[52] U.S. Cl. .......... 235/61.12, 40/159, 340/149, 340/174.1
[51] Int. Cl. .......... G06k 19/02, G09f 1/12, G11b 5/00
[50] Field of Search .......... 235/61.12; 40/159; 340/149(A); 340/174CT, 174.1C; 340/(Inquired)

[56] References Cited

UNITED STATES PATENTS

| | | | |
|---|---|---|---|
| 2,783,454 | 2/1957 | North | 340/149(A) |
| 2,914,746 | 11/1959 | James | 340/149(A) |
| 2,984,921 | 5/1961 | Herzig | 235/61.12UX |
| 3,141,683 | 7/1964 | Engelstein | 235/61.12X |
| 3,165,848 | 1/1965 | Langan | 235/61.12UX |
| 3,245,697 | 4/1966 | Nugent | 340/149(A) |
| 3,312,009 | 4/1967 | Beispel | 40/159 |
| 3,339,303 | 9/1967 | Anderson | 40/159 |
| 3,373,265 | 3/1968 | Smitzer | 235/61.12 |

*Primary Examiner*—Daryl W. Cook
*Assistant Examiner*—Robert M. Kilgore
*Attorney*—Michael Ebert

ABSTRACT: A microfiche master or other forms of a transparent multiple-channel jacket for storing and displaying data such as microfilm images, the jacket being constituted by two superposed panels of flexible clear-plastic sheeting which are joined together by spaced ribs defining chambers or channels wherein microfilm strips may be inserted, at least one rib having a hot-melt coating to effect bonding thereof to the panels, which coating has a finely divided magnetizable material dispersed therein whereby the rib provides a magnetic recording track adapted to receive identifying data to facilitate automatic filing and retrieval of the jacket.

INVENTOR.
ISIDORE DORMAN
BY
ATTORNEY

MICROFICHE MASTER HAVING MAGNETIC TRACKS

This invention relates generally to transparent multiple-channel jackets or microfiche masters for protectively storing and displaying microfilm images, and more particularly to a jacket which incorporates a magnetic recording track.

In order to conserve storage space and afford a ready means for retrieving information, it is now common practice to photograph documents, records, books and various forms of technical data in a sharply reduced scale on microfilm. Conventionally, a microscale image of each book page or document is recorded on a separate frame on a microfilm roll. To view the recorded data, the roll is inserted in a reader or optical projector, the film being advanced to place a selected frame into the projection window whereby an enlarged and readable image is cast on a screen.

In recent years, a new technique has been developed to place a group of microfilm images on a single sheet rather than along a film roll. In such sheets, which are known commercially as "microfiches", the microscale images are generally arranged serially along parallel rows, the sheet also bearing an identifying title which can be read by the unaided eye. The microimages are therefore arrayed in a grid formation on the sheet. A microfiche is useful where one wishes to incorporate on a single reproducible sheet, interrelated documents or other information pertaining to a particular subject matter.

An original microfiche is known as a master. The principal advantage of a microfiche master, apart from the fact that it provides a consolidated file record, is that it is readily reproducible to form additional or reference copies. The most effective way of deriving transparent reference copies from a microfiche master is by the contact printing process, the microfiche master serving as the negative. In contact printing, a sensitive film is exposed in contact with the microfiche master. During exposure, the exposing light rays pass through the master to the emulsion side of the film.

The advantages inherent in microfiches have been outlined in the Oct. 1963 issue (Number 66) of the National MicroNews, the official journal of the National Microfilm Association. Among these advantages, are that the microfilm can provide rapid low cost dissemination of information while effecting savings in storage space and bulk. Also it can provide master negatives to produce printing plates for offset reproduction, whenever this might be required. Because of the unitary nature of microfiche, it is readily adaptable to virtually all indexing and coding systems.

In the U.S. Pat. No. 3,238,655, to Engelstein there is disclosed a preferred form of microfiche master where instead of adhering microfilm strips to a backing sheet, the strips are inserted within the channels of a multiple-channel jacket which act to protect the strips and also to facilitate contact printing. The jacket is constituted by two superposed panels of clear plastic material interconnected by parallel ribs. An important feature of the Engelstein jacket is that the top panel is extremely thin so that while it is interposed between the microfilm strips and the sensitive film used in contact printing, it does not interfere with or distort the reproduced images.

When a filing system makes use of microfiche masters or multiple-channel jackets on a large scale, some form of automatic access or retrieval arrangement becomes desirable to avoid the need for manual operations which are time consuming and costly. If, for example, a given system includes several hundred thousand microfiche masters classified along conventional lines, and an order is received for a particular master which is identified by a title or code number, a clerk must proceed to search for the particular master. After a reference copy is made of this master, the clerk must return it to its proper position in the file. But if this master is misfiled, and this is not unusual, it becomes very difficult to locate it when a demand is subsequently made for the same master.

Accordingly, it is the main object of this invention to provide a microfiche master or similar form of multiple-channel transparent jacket which incorporates a magnetic track.

A significant feature of the invention resides in the fact that identifying data in code or alpha-numeric form may be recorded on the track, and for purposes of access or retrieval the jacket in this system may be magnetically scanned by known techniques to locate the desired jacket. Also by entering relevant data on the track, all jackets in a system may be magnetically scanned and analyzed by computer techniques.

While it it known to provide IBM cards, checks and data sheets which are indexed and processed, with magnetic tracks, such tracks are subject to wear and erosion by repeated scanning against magnetic pickup heads. Thus it is a more specific object of this invention to provide a multiple-channel jacket having at least one magnetic recording track which is shielded against abrasion without impairing its function.

Still another object of the invention is to provide a jacket which incorporates a magnetic track and which may be manufactured efficiently at low cost.

For a better understanding of the invention as well as other objects and further features thereof, reference is made to the following detailed description to be read in conjunction with the annexed drawings wherein.

Figure 1:
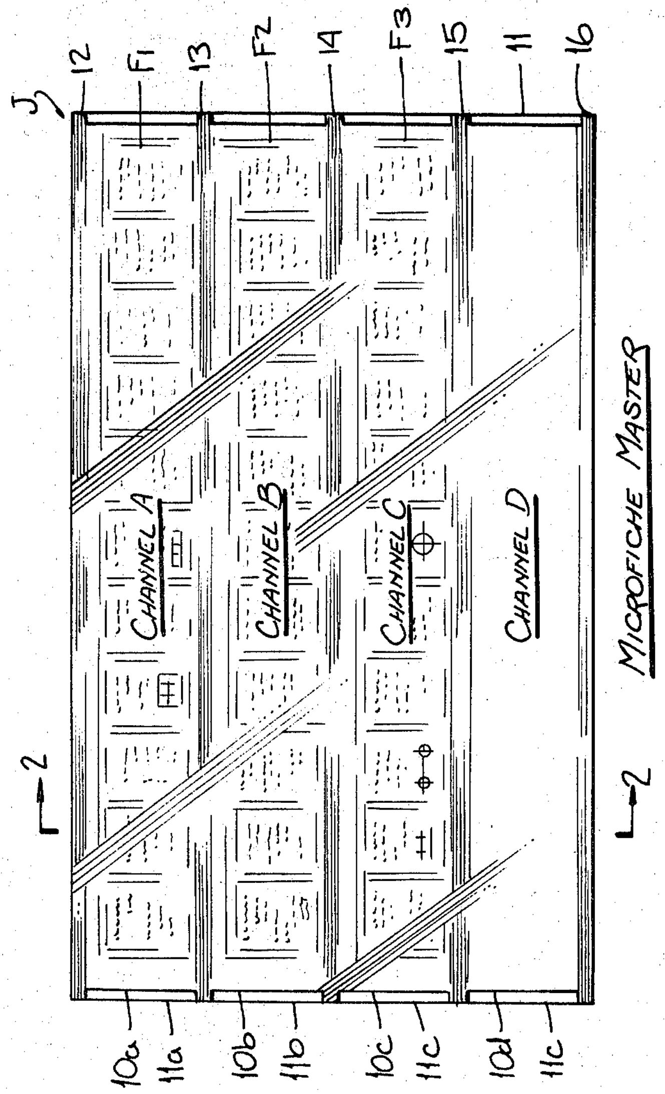
FIG. 1 is a plan view of a preferred embodiment of a microfiche master in accordance with the invention.

Referring now to the drawings and more particularly to FIG. 1, a microfiche master in accordance with the invention is constituted by a transparent multiple-channel jacket J thereof, whose parallel channels A, B, C and D contain microfilm strips $F_1$, $F_2$ and $F_3$. Channel D is left vacant to permit the future insertion of a microfilm strip, should it be desired to add further data to the microfiche.

The multiple-channel jacket according to the invention comprises two transparent rectangular panels 10 and 11, in superposed relation, the panels being formed of clear, flexible plastic material, such as cellulose acetate, polyester film, Mylar, or any other suitable transparent sheeting having high tensile strength. Interposed between the top and bottom panels and bonded thereto are plastic or paper ribs formed by longitudinally extending strips 12, 13, 14, 15 and 16 in parallel relation. Ribs 12 and 16 are aligned with the long sides of the panels, the remaining ribs being disposed at intermediate positions to define parallel channels A, B, C and D open at either end. The channels are of like width to accommodate microfilm strips of a given size, such as 16 mm. or 35 mm. film.

To facilitate the insertion of film strips into the channels, the extremities of top panel 10 in each channel are cut back or notched substantially the full width of the channel opening, such as at 10*a* and 10*b*, whereby the underlying edges of panel 11 are exposed to form steps, such as steps 11*a* and 11*b*. It will be noted that the ribs 12 and 16 extend the full length of panel 11 to provide guides at the channel entrances. The ribs may be of colored material to mark the channel boundaries. While the notches are shown as excluding the adjacent portions of the ribs, in practice the notches may cut into the ribs.

Figure 2:
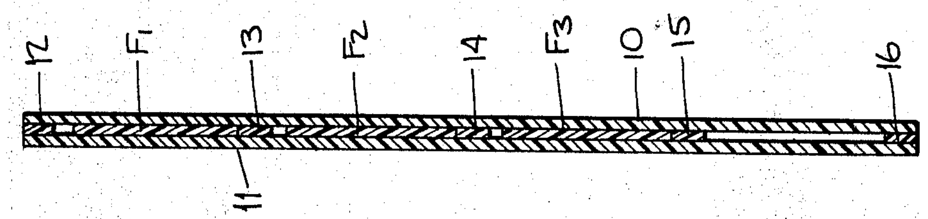
FIG. 2 is a section taken along line 2–2 in FIG. 1.

It is not essential that the channel be stepped or lapped at both ends, since in practice insertions are made in a given direction and it is sufficient that the channel entry only be lapped. This invention is not limited to the particular construction shown in FIGS. 1 and 2, and any number of channels may be made in any desired width. When using film inserting machinery as disclosed in U.S. Pat. No. 2,937,483, film insertion is made at an angle to the plane of the jacket, the edge of the film striking the step and being flexed thereby to bend inwardly into the channel through the opening.

Figure 3:
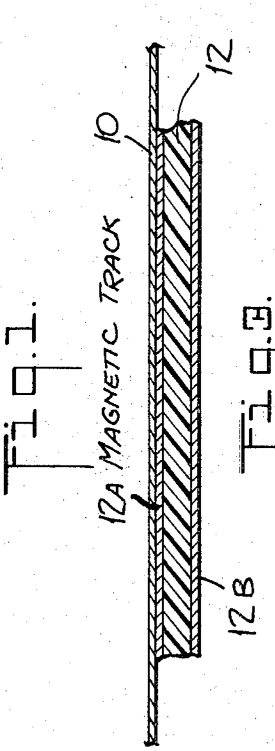
FIG. 3 is an enlarged section taken through a single rib.

To bond ribs 12 to 16 to panels 10 and 11, the ribs are first coated with a hot-melt material, that is, a material which is a fast drying, nonvolatile adhesive made of synthetic resin and plasticizer and applied hot in its molten state. Thus as shown in FIG. 3, rib 12 has an upper and lower layer 12A and 12B respectively of a hot-melt coating. In accordance with the invention there is dispersed in top layer 12A a finely divided powder to render this rib magnetizable and suitable for magnetic recording and playback. This powder may be a ferric oxide or any other magnetizable material suitable for magnetic recording. In practice, the magnetic track may be similarly formed on a rib extension going beyond the margin of the jacket.

It is important to note that the magnetic track, which is incorporated in the hot-melt top layer 12A, lies directly under top panel 10. This top panel is made extremely thin, in order not to displace the track a significant distance from the magnetic heads used in conjunction therewith and also to facilitate contact printing, for it is this panel which is interposed between the microfilm strips and the sensitive photographic film.

In practice, it has been found that Mylar (ethyl glycol terephthalate) sheeting of about 1/2-mil thickness and of exceptional transparency, is effective for this purpose, for it makes it possible for the microfilm to be virtually in contact with the emulsion side of the sensitive film, so that no perceptible loss in image sharpness is experienced in reproduction. On the other hand, the back panel is made of somewhat thicker Mylar, such as 3 mils, to give body and strength to the jacket. This thickness in no way interferes with contact printing or with magnetic recording.

The thin top panel, while not sufficiently thick to militate against magnetic recording and playback operations nevertheless protects the magnetic track against wear, for in ordinary scanning operations, a degree of abrasion is experienced which ultimately wears down the tracks. The top panel not only prevents abrasion, but because it has a low coefficient of friction, facilitates scanning operations.

Alternatively, the ribs may be made of standard magnetic recording tape of good quality slit to rib size and bonded to the top and bottom panels. The rib thickness should be about equal to the thickness of the film inserted in the channels in order to avoid a space between the film and the top panel of the jacket. If magnetic tape is used for the ribs and its thickness is insufficient, it may be laminated to another strip to attain the necessary thickness.

While there have been preferred embodiments to the invention it is to be understood that many changes and modifications may be made therein without departing from the essential spirit of the invention, as defined in the annexed claims.

I claim:

1. A random-access filing system having a plurality of identical transparent microfilm jackets which are individually identifiable by magnetic scanning, each jacket comprising:

a. two panels formed of flexible synthetic plastic transparent material in superposed relation, the top panel having a relatively low coefficient of friction and a thickness no greater than one mil to facilitate magnetic scanning of a track on the jacket by a magnetic head engaging said top panel, and b. a plurality of spacing ribs interposed between said panels and disposed along parallel lines, said ribs being bonded to said panels to define channels into which microfilm may be inserted, at least one of said ribs covered by said top panel incorporating magnetizable material whereby said rib constitutes a magnetic recording track onto which identifying data is recordable.

2. A system as set forth in claim 1, wherein said one rib has a hot-melt coating on the upper face thereof to effect bonding to the top panel, which coating includes a dispersion of magnetizable powder.

3. A system as set forth in claim 1, wherein said one rib is formed of magnetic recording tape.

4. A system as set forth in claim 1, wherein said ribs have a thickness substantially equal to that of film to be inserted in said channels.